July 2, 1963   J. N. PRESTON   3,095,703
SUPER-CHARGED JET TORQUE AND PROPULSION REVERSE REACTION ENGINE
Filed Sept. 19, 1961
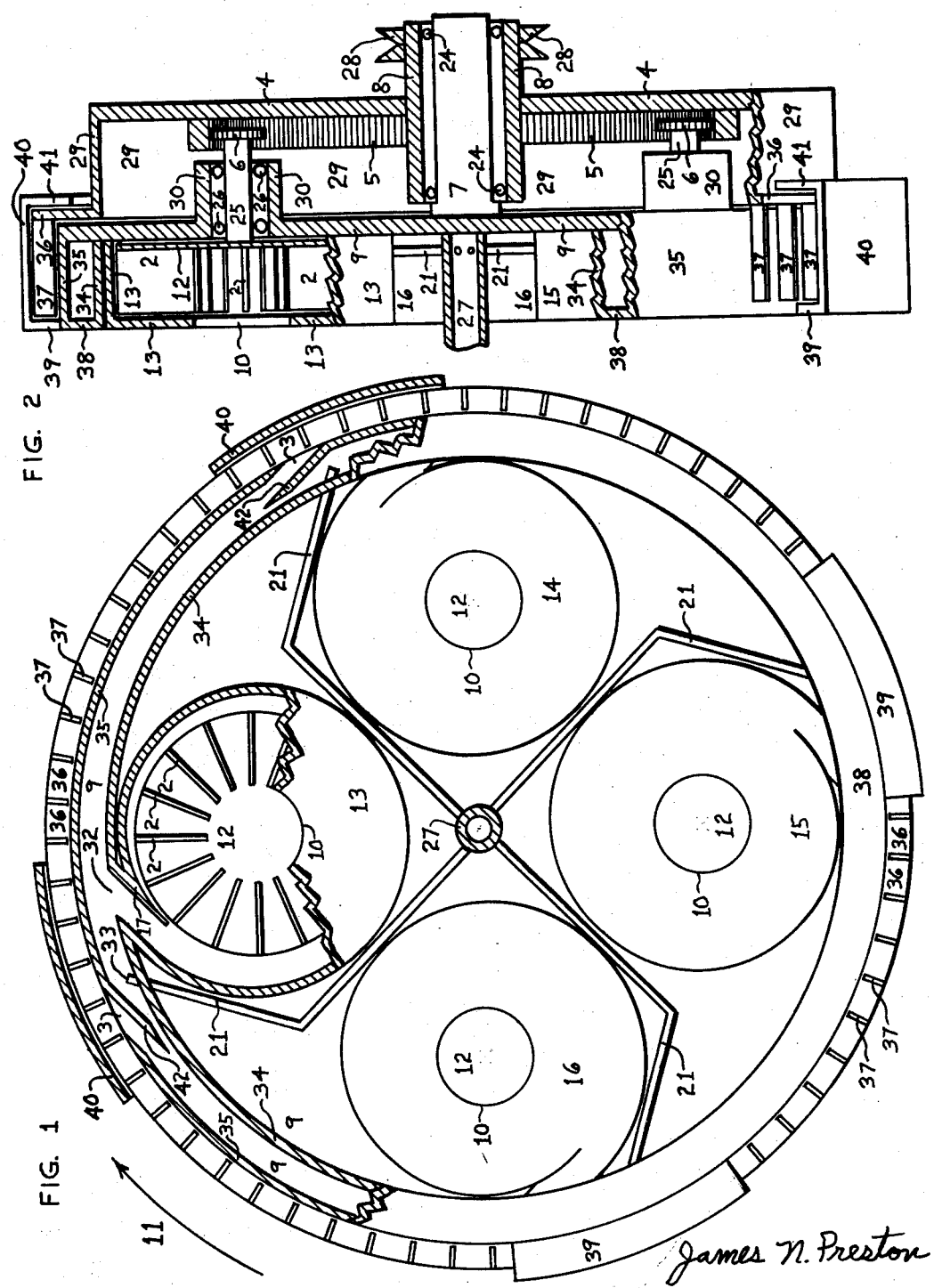

United States Patent Office 3,095,703
Patented July 2, 1963

3,095,703
SUPER-CHARGED JET TORQUE AND PROPULSION REVERSE REACTION ENGINE
James N. Preston, 1633 W. Campbell, Phoenix, Ariz.
Filed Sept. 19, 1961, Ser. No. 139,137
2 Claims. (Cl. 60—39.35)

This invention is a modification and continuation-in-part of applicant's copending invention entitled: Super-Charged Fire Jet Torque and Propulsion Engine, Serial No. 138,362, filed September 15, 1961. The difference is that the hub and assembly rotates instead of the axle and its assembly. This modification makes it easier to supply its non-rotating combustion chamber with fuel and to lubricate the bearings of its planetary air compressors.

This invention is a modification of the fire jet torque and propulsion reaction engine with the improvement being in the air compressor which consists of a number of smaller planetary centrifugal type air compressors replacing the former single rotor centrifugal type air compressor. This arrangement forces many times as much air per revolution into the combustion chamber than did the previous single rotor air compressor and thus greatly increases its torque and thrust per revolution of the main axle.

This engine employs a slight modification of the combustion exhaust gas back-pressure assembly of applicant's earlier improvement entitled: Torque and Propulsion Reaction Engine #3 which makes it an extremely efficient design.

FIGURE 1 shows the front view of the engine with part of one planetary air compressor, combustion chamber, and back-pressure assembly cut away.

FIGURE 2 shows the adjacent right side view of the engine when the front view is rotated 90 degrees to its right on its vertical axis and has part of one planetary air compressor, the combustion chamber, the back-pressure assembly, the ring gear, the hub, pulley, and other parts cut away.

Referring to the drawing in more detail, 9 indicates the stationary center disc which is affixed at its radial center to the center of the right circular end of the axle 7 which extends perpendicular from the face of said stationary center disc 9. The hub 8 rotates on ball bearings 24 clockwise 11 around the axle 7.

The combustion chamber is contained on one side by the face of the center disc 9 adjoining the periphery of said center disc 9. The right circular combustion outer cylinder 35 is affixed at one end to the periphery of said center disc 9 and extends for a distance on a line perpendicular from the face of said center disc 9 to a line in a plane which is parallel to said center disc 9 and on the face of the center disc 9 opposite to that affixed to the axle 7. The axis-toward side of the combustion chamber is contained by the right circular combustion inner cylinder 34 which has a somewhat smaller radius than that of the combustion outer cylinder 35 and extends on a line perpendicular from the face of the center disc for the same distance as does the combustion outer cylinder 35. The combustion ring disc 38 is affixed at its adjacent face to the adjacent right circular end of the combustion outer cylinder 35 and extends to the combustion inner cylinder 34 to seal the combustion chamber which is air-tight except for a number of combustion air intake ports 32 cut through the combustion inner cylinder 34, a number of combustion exhaust ports 3 cut through the combustion outer cylinder 35, and the fuel intake jets 33.

A number of planetary centrifugal type air compressors 13, 14, 15, and 16 are affixed to the same face of the center disc 9 as is the combustion chamber with each one being equidistant from the axis of the axle 7 and closely adjacent to the combustion inner cylinder 34. The rotor 12 of each planetary air compressor rotates clockwise 11 in a plane parallel to the closely parallel adjacent center disc 9; each said rotor 12 being affixed at its radial center to a planetary axle 25 which extends parallel to the main axle 7, through the center disc 9 and rotates on the ball bearings 26 within a planetary hub 30 which is affixed to the opposite face of the center disc 9.

The rotor blades 2 affixed to the face of each rotor 12 within each planetary air compressor forces air entering each compressor air intake port 10 outward by centrifugal force through a combustion air intake port 3 into the adjacent combustion chamber.

Fuel is pumped into the combustion chamber in the vicinity of each combustion air intake port 32 at each fuel intake jet 33 which is supplied through a fuel pipe 21 which extends from the main fuel pipe 27.

The ignited and expanding gases within the combustion chamber are allowed to escape at each combustion exhaust port 3 which is located on the adjacent counter-clockwise side of each combustion air intake port 32. The combustion exhaust baffle 42, extending perpendicular from the face of the center disc 9 to the ring disc 38, is affixed to the combustion outer cylinder 35 within the clockwise 11 side of each combustion exhaust port 3 and extends in a counter-clockwise direction into the combustion chamber for a distance on a line that is tangent to the combustion inner cylinder 34 in order to allow the combustion exhaust gases to exhaust from each combustion exhaust port 3 in a clockwise 11 tangent direction. The combustion exhaust gases impinge against the back-pressure vanes which extend perpendicular across and just outside the periphery of the combustion outer cylinder 35 to rotate the back-pressure assembly affixed to the hub 8 in a clockwise 11 direction. Torque power is transmitted through the pulley 28 which is affixed to the hub 8.

When the hub 8 and back-pressure assembly rotate in a clockwise 11 direction, the rotor 12 of each planetary air compressor affixed to the center disc 9 is turned in a clockwise 11 direction by a planetary gear 6 which is centered and affixed to the opposite end of its planetary axle 25. Each said planetary gear 6 is in mesh with the rotating ring gear 5 which is centered around, and held in a plane perpendicular to, the axis of the axle 7 by the affixed back-pressure disc 7 which is affixed to the periphery of the hub 8.

The force of the exhaust gases exhausting from the combustion chamber rotates the hub 8 clockwise 11 by means of the back-pressure assembly which is affixed to the hub 8. A number of back-pressure vanes 37 are affixed perpendicular to the face of the back-pressure ring disc 36 which is closely parallel adjacent to the center disc 9 on the face opposite the combustion chamber. Said back-pressure ring disc 36 extends from a radius generally equal to that of the combustion inner cylinder 34 to a radius somewhat greater than that of the combustion outer cylinder 35 and held in place at its inner radius by the adjoining back-pressure support cylinder 29 which extends to the periphery of the back-pressure disc 4. Each back-pressure vane 37 extends perpendicular from the face of the back-pressure ring disc 36 across, and closely parallel adjacent to, the periphery of the combustion outer cylinder 35 and extends for a distance on a radial line to a radius equal to that of the back-pressure ring disc 36.

The back-pressure housing extending for a distance on the clockwise 11 and counter-clockwise side of each combustion exhaust port prevents the combustion exhaust gases from freely escaping the influence of the back-pressure vanes 37 until said back-pressure vanes 37 have rotated out of the vicinity of each combustion exhaust port 3. A back-pressure cylinder segment 40 is closely adjacent to the outer edges of the back-pressure vanes 37 and is held in place by the adjoining back-pressure ring segment 39 extending from the periphery of the combustion outer cylinder 35 and also closely adjacent to the back-pressure vanes 37. The second ring segment 41, closely parallel adjacent to the outside face of the back-pressure ring disc 36, is affixed to the adjacent side of the back-pressure cylinder segment 40 and extends for a distance toward the back-pressure support cylinder 29.

I claim:

1. A reaction engine comprising; a combustion chamber is provided which is contained on its periphery by means of a combustion outer cylinder, on one end by means of a concentric combustion ring disc which concentrically adjoins one end of said combustion outer cylinder, on the oposite end by means of a concentric stationary center disc which concentrically adjoins the opposite end of said combustion outer cylinder; said combustion chamber is contained on its axis-toward side by means of a concentric combustion inner cylinder which concentrically adjoins said combustion ring disc and said stationary center disc; said combustion chamber is provided with at least one combustion air intake port which is located generally in the combustion inner cylinder; said combustion chamber is provided with at least one combustion exhaust port which is located generally in the combustion outer cylinder; said combustion exhaust port is provided with a substantially larger cross-section area than that of the combustion air intake port; said combustion chamber is provided with at least one fuel intake jet which is located generally in the combustion inner cylinder; an axle is provided which is in connection with the stationary center disc and located generally concentric with the combustion outer cylinder; a back-pressure disc is provided which rotates concentrically around the axis of the axle on bearings; a plurality of back-pressure vanes are provided; each back-pressure vane is in connection with the back-pressure disc and extends in a general axial direction for a distance generally across the plane of the combustion chamber generally closely adjacent to the periphery of the combustion outer cylinder; each said back-pressure vane extends outward for a distance in a radial direction from an axially concentric perimeter which is provided with a diameter generally slightly greater than that of the periphery of the combustion outer cylinder; each said back-pressure vane is provided with a cross-section surface area at least as large as the cross-section area of the combustion exhaust port and located on a perimeter whereby rotating generally closely adjacent past the combustion exhaust port during each revolution of the back-pressure disc around the axis of the axle; at least one generally centrifugal-type axle-driven planetary air compressor is provided which is in connection with the stationary center disc and located geenrally at a distance from the axis of the axle; said planetary air compressor is activated by means of a planetary axle which is provided with rotation around its own axis at a greater r.p.m. velocity than that of the back-pressure disc by means of a suitable torque transmission train, generally a gear train, which gears said planetary axle to the back-pressure disc for the purpose of activating said planetary air compressor which provides compression of expandable fluid, generally air, continuously through the combustion air intake port into the combustion chamber when said back-pressure disc is rotated around the axis of the axle; thermal energy is provided within said combustion chamber for the purpose of providing said expandable fluid therein with a substantially larger fluid volume therein by means of fluid expansion thereby providing a fluid exhaust velocity and p.s.i. pressure to said larger fluid volume at the combustion exhaust port to a degree approaching the intake fluid velocity and p.s.i. pressure of compressed expandable fluid within the combustion air intake port prior to entering said combustion chamber; any combustible fuel is forced through the fuel intake jet into said combustion chamber generally by pump means wherein igniting with compressed expandable fluid, normally compressed air, thereby providing thermal energy and a larger fluid volume; larger fluid volume, consisting normally of ignited and expanding combustion gases, exhausts from the combustion chamber through the combustion exhaust port generally directly into the plane and influence of the back-pressure vanes generally from the axis-toward side of said back-pressure vanes; a means is provided, located generally within the combustion chamber, to direct the exhausting larger fluid volume from the combustion chamber and the combustion exhaust port generally directly into the plane and influence of the back-pressure vanes in a tangential general axially transverse direction generally from the axis-toward side of said back-pressure vanes whereupon said larger fluid volume impinges against a surface area of each back-pressure vane in the path of the exhausting larger fluid volume which provides said back-pressure vanes and back-pressure disc with continuous rotation around the axis of the axle thereby providing torque energy which provides rotation to the planetary axle of the planetary air compressor by torque transmission means which provides continuous compression of fluid into the combustion chamber thereby continuing the cycle which provides continuous torque energy and propulsion thrust.

2. The invention as claimed in claim 1 wherein the axle is located generally concentric with the combustion outer cylinder and the larger fluid volume exhausts from the combustion chamber through the combustion exhaust port wherefrom flowing generally directly into the plane and influence of the back-pressure vanes on a tangent in a general axially transverse direction generally from the axis-toward side of said back-pressure vanes; an axially concentric back-pressure means is provided which includes rotating and stationary back-pressure walls which enclose the plane and influence of the back-pressure vanes; each respective back-pressure wall located closely adjacent or adjoining to each respective side of the plane and influence of the back-pressure vanes for the purpose of substantially containing the exhausting larger fluid volume within the plane and influence of the back-pressure vanes for an arc distance extending from the vicinity of the combustion exhaust port thereby providing continuous fluid p.s.i. back-pressure and velocity between said combustion exhaust port of the combustion chamber and adjacent back-pressure vanes to a degree approximately equal to fluid p.s.i. pressure and velocity of said larger fluid volume within said combustion chamber which causes said back-pressure vanes to rotate around the axis of the axle and away from the vicinity of said combustion exhaust port with a degree of continuous torque energy proportional to the cross-section area of the combustion exhaust port and to the degree of fluid p.s.i. pressure and velocity of said exhausting larger fluid volume; an axially concentric normally segmented back-pressure cylinder is provided which provides a stationary wall of said back-pressure means located closely adjacent to the periphery of the plane and influence of the back-pressure vanes; an axially concentric normally segmented back-pressure ring is provided which concentrically adjoins said normally segmented back-pressure cylinder and provides a stationary side wall said back-pressure means located closely adjacent to a side of the plane and influence of said back-pressure vanes; said back-pressure means include an axially concentric cylinder which provides a stationary back-pressure wall of said back-pressure means located closely adjacent to the axis-toward side of the back-pressure vanes and adjoining said axially concentric normally segmented back-pressure ring; the combustion outer cylinder functions generally as both the peripheral containing wall of the combustion chamber and said axis-toward stationary back-pressure wall of said back-pressure means; an axially concentric back-pressure ring disc is provided which is in connection with the back-pressure disc and which provides a rotating side wall of said back-pressure means located adjoining to said back-pressure vanes; an axially concentric back-pressure support cylinder concentrically adjoins said back-pressure ring disc and the back-pressure disc; an axially concentric normally segmented second back-pressure ring is provided which concentrically adjoins the normally segmented back-pressure cylinder in a plane adjacent to said back-pressure ring disc; said normally segmented back-pressure cylinder, adjoining normally segmented second back-pressure ring, and the normally segmented adjoining back-pressure ring form a back-pressure housing which forms a part of the back-pressure means; the combustion exhaust port provides entrance means for the exhausting larger fluid volume from the combustion chamber to flow generally directly into the back-pressure means generally from the axis-toward side of said back-pressure means and tangentially into the plane and influence of the back-pressure vanes; at least one of the aforesaid back-pressure walls of the back-pressure means is segmented for the purpose of providing an exhaust means for said exhausting larger fluid volume from within the back-pressure means and the plane and influence of the back-pressure vanes generally into the atmosphere after an arc distance of containment therein thereby continuing the cycle which provides continuous torque energy and propulsion thrust from thermal energy.

References Cited in the file of this patent

UNITED STATES PATENTS

| | | |
|---|---|---|
| 2,448,972 | Gizara | Sept. 7, 1948 |
| 2,594,629 | Exner | Apr. 29, 1952 |
| 2,746,248 | Butler | May 22, 1956 |